United States Patent [19]

Kelly, Jr.

[11] 3,884,249

[45] May 20, 1975

[54] PROCESS FOR CLEANING HALOPHOSPHATE FURNACES

[75] Inventor: John L. Kelly, Jr., Towanda, Pa.

[73] Assignee: GTE Sylvania Incorporated, Stamford, Conn.

[22] Filed: Sept. 9, 1974

[21] Appl. No.: 504,548

Related U.S. Application Data

[63] Continuation of Ser. No. 299,301, Oct. 20, 1972, abandoned.

[52] U.S. Cl.................... 134/2; 134/19; 134/22 R; 134/37; 432/2
[51] Int. Cl................................................ B08b 5/00
[58] Field of Search ............ 134/2, 5, 19, 22 R, 37, 134/105; 252/301.4 P, 374, 377; 65/27; 432/2, 75; 110/1 K

[56] References Cited
UNITED STATES PATENTS

| 312,142 | 2/1885 | McCandless | 134/2 X |
| 1,795,785 | 3/1931 | Lockwood | 134/19 UX |
| 2,619,471 | 11/1952 | Butler | 252/301.4 P |
| 2,900,285 | 8/1959 | Darmann et al. | 134/19 X |
| 3,586,637 | 6/1971 | Blasse et al. | 252/301.4 P |
| 3,654,174 | 4/1972 | Dale et al. | 252/301.4 P |

Primary Examiner—S. Leon Bashore
Assistant Examiner—Marc L. Caroff
Attorney, Agent, or Firm—Norman J. O'Malley; Donald R. Castle; John C. Fox

[57] ABSTRACT

A process suitable for cleaning an air-tight halophosphate phosphor furnace is disclosed that involves heating the various zones of the hearth of the furnace to a temperature of about 1,450° F to about 2,300° F and passing a nitrogen-hydrogen gas mixture through the heated zones for at least 4 hours to volatilize the scale from the furnace. The gas mixture contains from about 10 to about 60% by volume of hydrogen.

3 Claims, No Drawings

PROCESS FOR CLEANING HALOPHOSPHATE FURNACES

CROSS-REFERENCE TO RELATED APPLICATION

This application is a continuation of Ser. No. 299,301, filed Oct. 20, 1972, now abandoned.

BACKGROUND OF THE INVENTION

This invention relates to a method suitable for cleaning tunnel-type atmospheric-tight halophosphate phosphor furnaces. More particularly, it relates to a process for removing the scale or deposits that build up on the walls of the furnaces from the production of halophosphate phosphors that utilize salts in their manufacture that volatilize and condense on the walls of the furnace.

In the manufacture of halophosphate phosphors the raw materials are heated in air-tight furnaces at elevated temperatures usually in the presence of fluxing agents to control particle size. For example, calcium halophosphate phosphors utilized in lamps are produced from calcium phosphate, a halide source and generally are activated by sources of manganese and antimony. Various zones, generally no more than eight, are operated at various temperatures within the broad range of from 1,000° F to 2,200° F. As can be appreciated, various materials are evolved as the solid state reaction proceeds. The materials that evolve deposit upon the walls of the furnace will eventually result in improper operation. Heretofore, to clean the furnace it was necessary to cool the furnace to ambient temperature, provide access to the interior of the furnace and mechanically remove the deposits. The total downtime including the reassembly of the furnace after cleaning and bringing the temperature up to operating level was generally about eight days. Additionally, the extreme changes in temperature resulted in fractured heating elements.

It is believed, therefore, a process which eliminates the manual labor, disassembly of the furnace, and reduces repairs and downtime would be an advancement in the art.

OBJECTS AND SUMMARY OF THE INVENTION

It is an object of this invention to provide a nonmanual method of removing deposits from an air-tight halophosphate phosphor furnace.

It is a further object of this invention to provide a method for cleaning halophosphate phosphor furnaces in a shorter period of time.

It is another object of this invention to provide a method whereby the solid deposits in a halophosphate furnace are volatilized and subsequently collected by the fume collection system.

These and other objects are achieved in one aspect of this invention by heating the various zones to a temperature of from about 1,450° F to about 2,300° F, and passing a hydrogen-nitrogen gas mixture through the furnace while at the foregoing temperatures for at least about 4 hours. The gas mixture contains from about 10 to about 60% by volume of hydrogen.

DESCRIPTION OF THE PREFERRED EMBODIMENTS

For a better understanding of the present invention, together with other and further objects, advantages, and capabilities thereof, reference is made to the following disclosure and appended claims.

The furnace is heated to at least about 1,450° F in each zone but below about 2,300° F. The minimum temperature preferred is about 1,700° F. In most furnaces the temperature in the various zones is monitored since during operation the temperature within each zone will vary from about 1,000° F to about 2,200° F. The operating temperature of each zone is generally determined empirically by each producer. In any event, control of the temperature of the zones during cleaning affords no particular problem.

The nitrogen-hydrogen gas mixture containing from about 10 to about 60% by volume of hydrogen can be provided by metering separate streams and allowing the mixture to be formed within the furnace or the mixture can be formed prior to injection into the furnace.

The time required for clean-out varies but is generally greater than 4 hours. The time required varies with the build-up prior to cleaning, the hydrogen content of the gas mixture and the temperature of the zones. The higher the hydrogen content the shorter the cleaning time. Higher temperatures also reduce the cleaning time. Mixtures above 60% by volume of hydrogen and temperatures in excess of 2,300° F can damage the furnace. In general, cleaning times below 72 hours are sufficient.

The hydrogen-nitrogen mixture at the temperatures heretofore disclosed effects the removal of the deposits and a relatively dense grayish-black fumes are evolved, however, these are collected in a fume collection system. Therefore, the process does not result in air pollution problems.

As can be appreciated, the present invention enables more frequent clean-outs thus enabling the furnace to be operated more of the time at peak efficiencies.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for cleaning deposits from atmospheric-tight halosphosphate phosphor furnaces comprising:
    a. heating each of various zones within said furnace to a temperature of from about 1,450° F to about 2,300° F;
    b. passing a nitrogen-hydrogen gas mixture through each of said zones while at said temperature, said mixture consisting essentially of from about 10 to about 60% by volume of hydrogen, balance nitrogen and
    c. maintaining the flow of said gas mixture and said temperature for from at least about 4 hours to about 72 hours.

2. A process according to claim 1 wherein said halophosphate phosphor is calcium halophosphate.

3. A process according to claim 2 wherein said temperature is from about 1,700° F to about 2,300° F.

* * * * *